Nov. 11, 1952 F. WEISS 2,617,605
CONDENSER WINDING METHOD
Original Filed Sept. 12, 1944 11 Sheets-Sheet 2
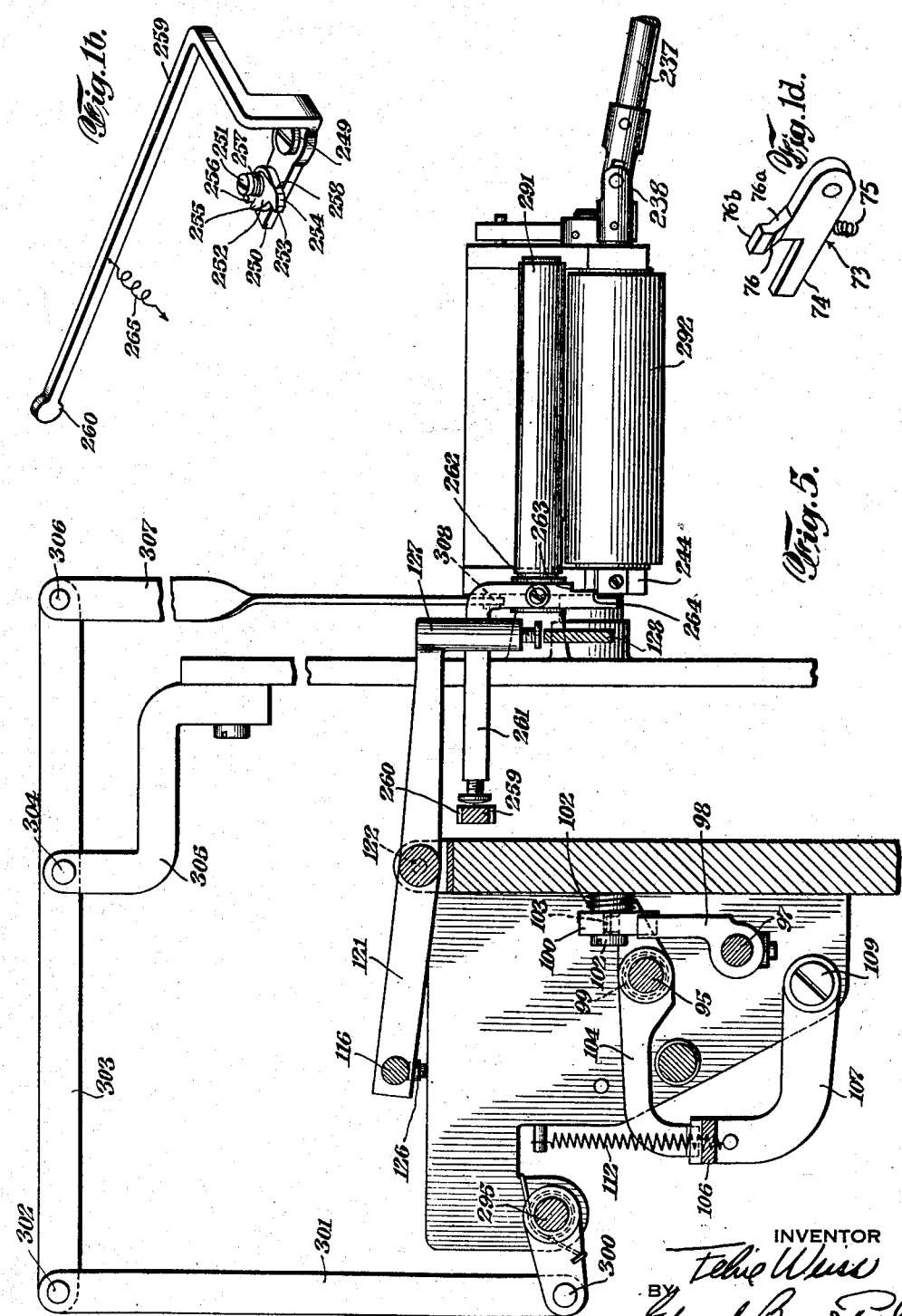

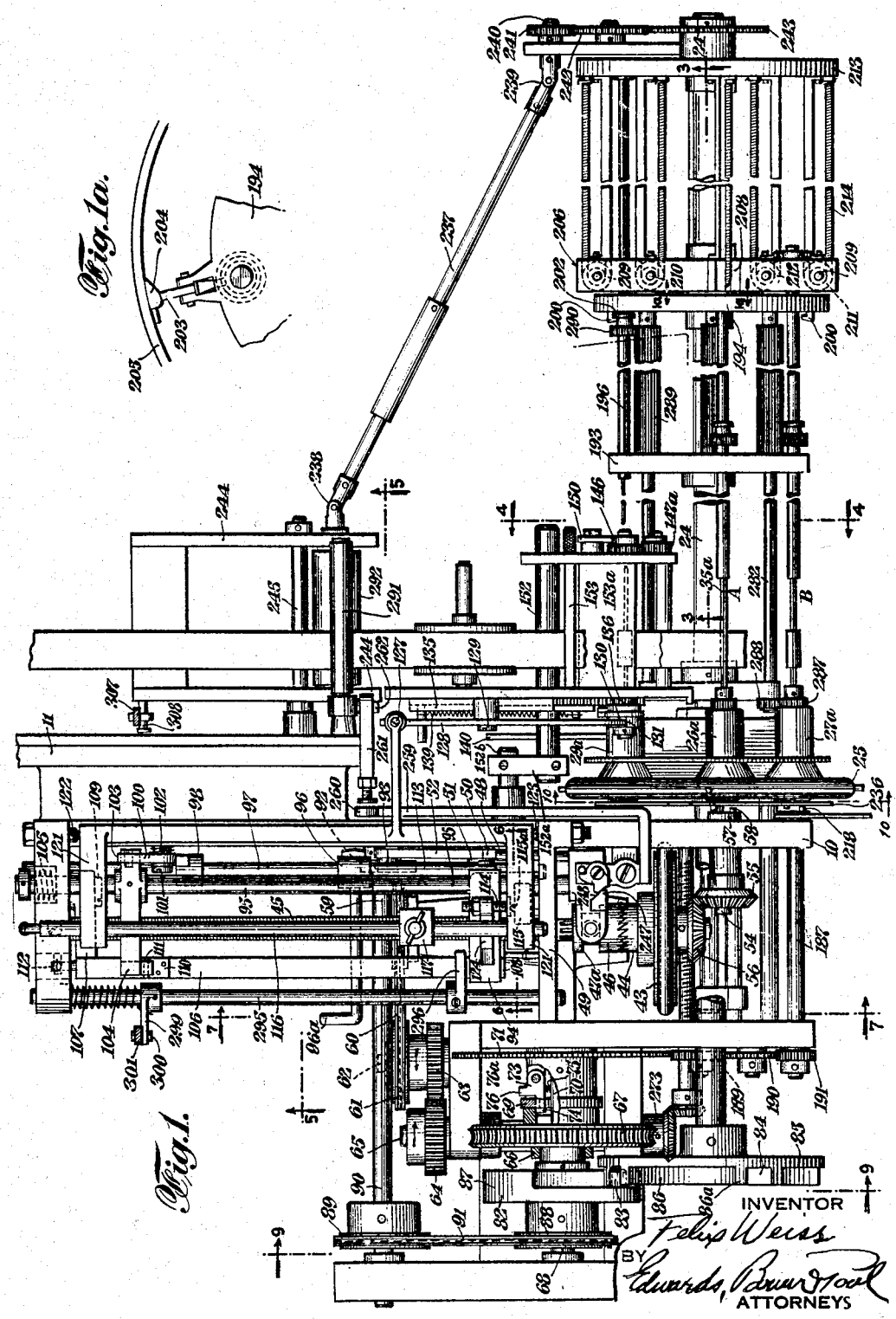

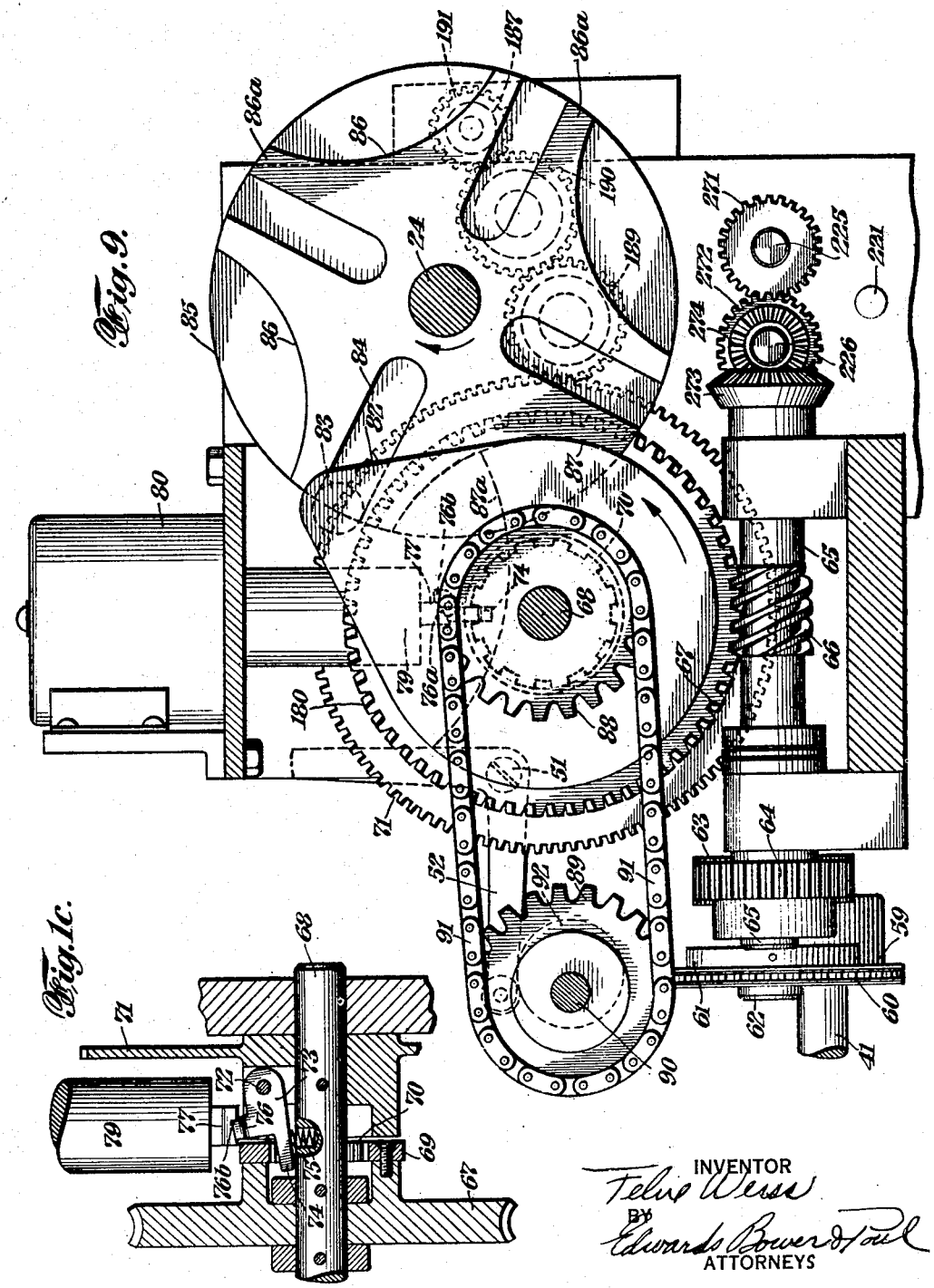

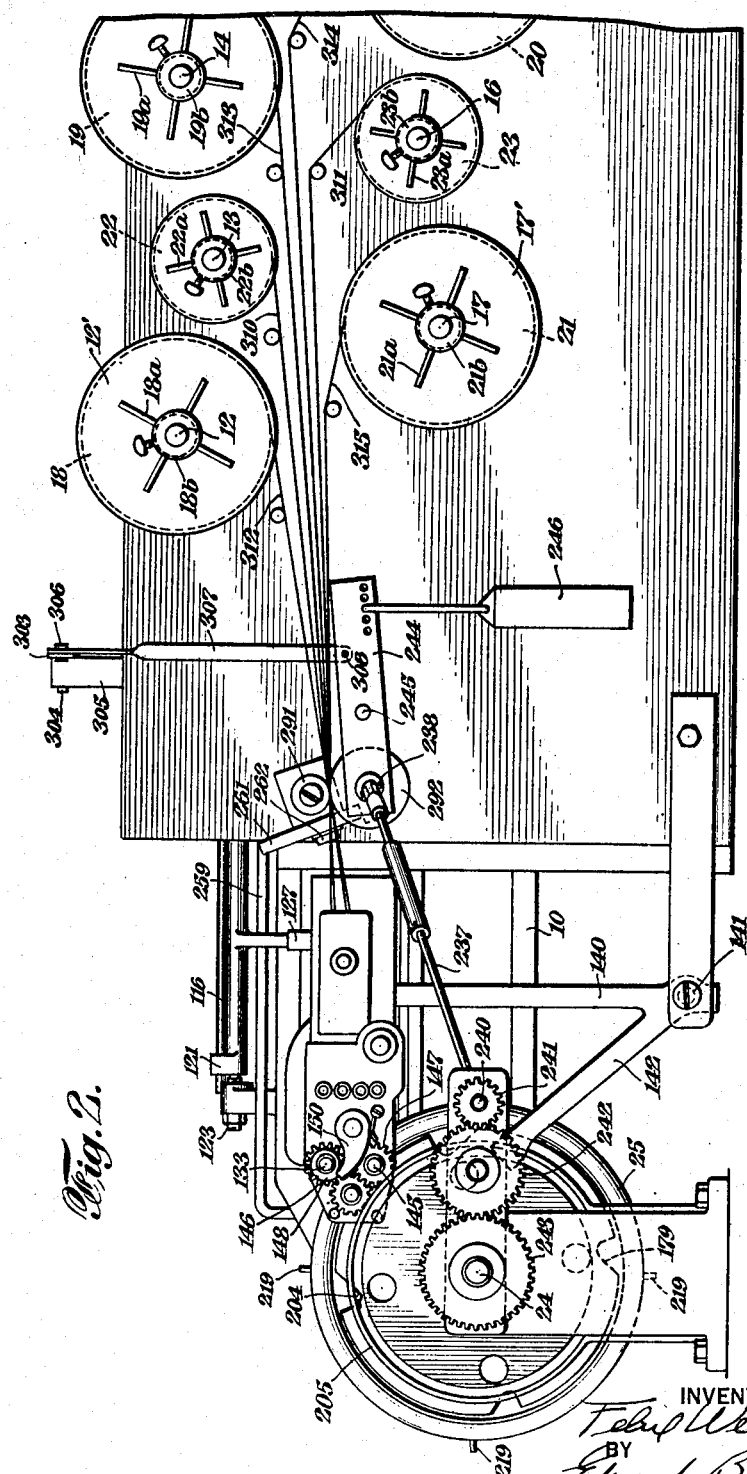

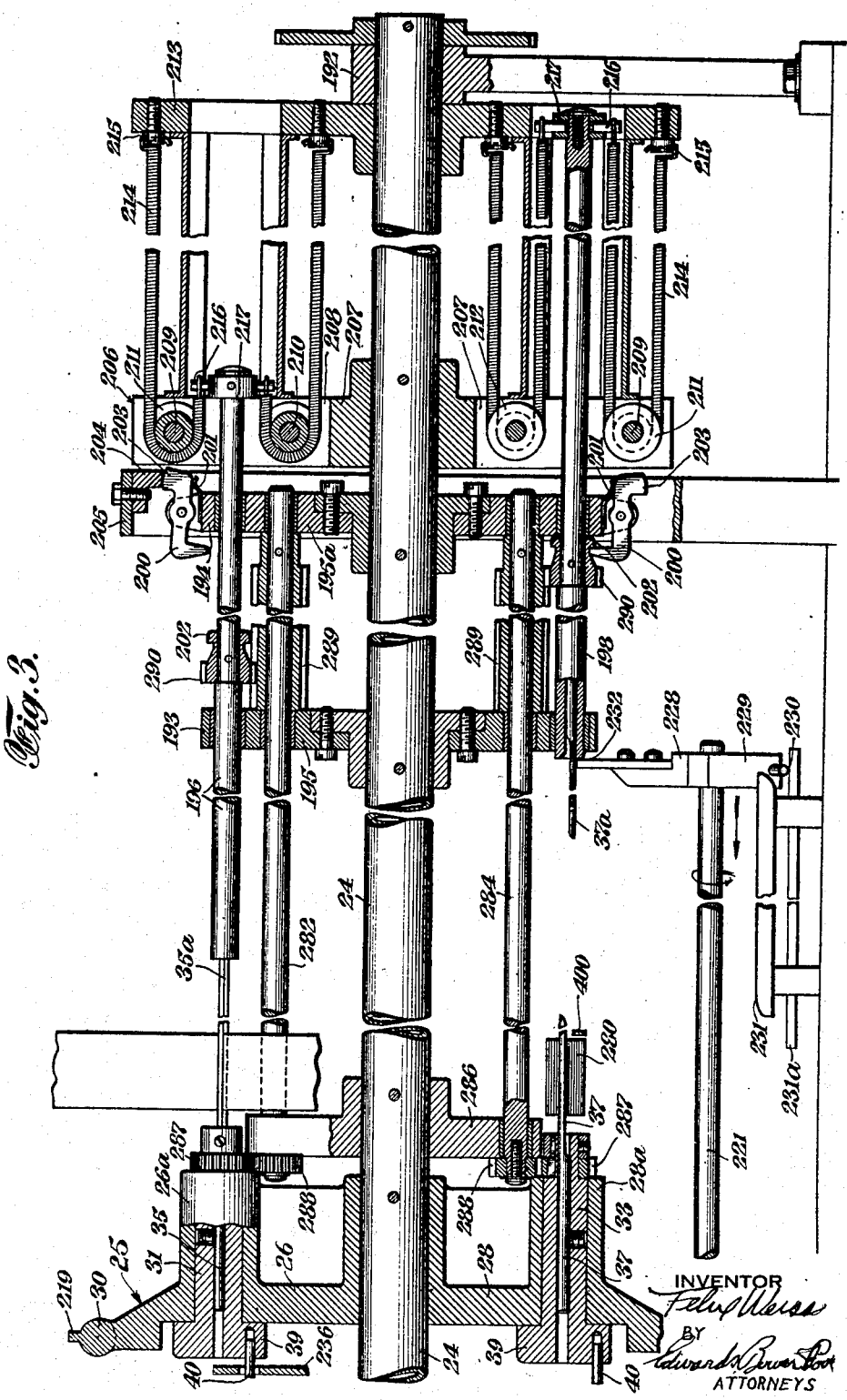

Nov. 11, 1952 F. WEISS 2,617,605
CONDENSER WINDING METHOD
Original Filed Sept. 12, 1944 11 Sheets-Sheet 7
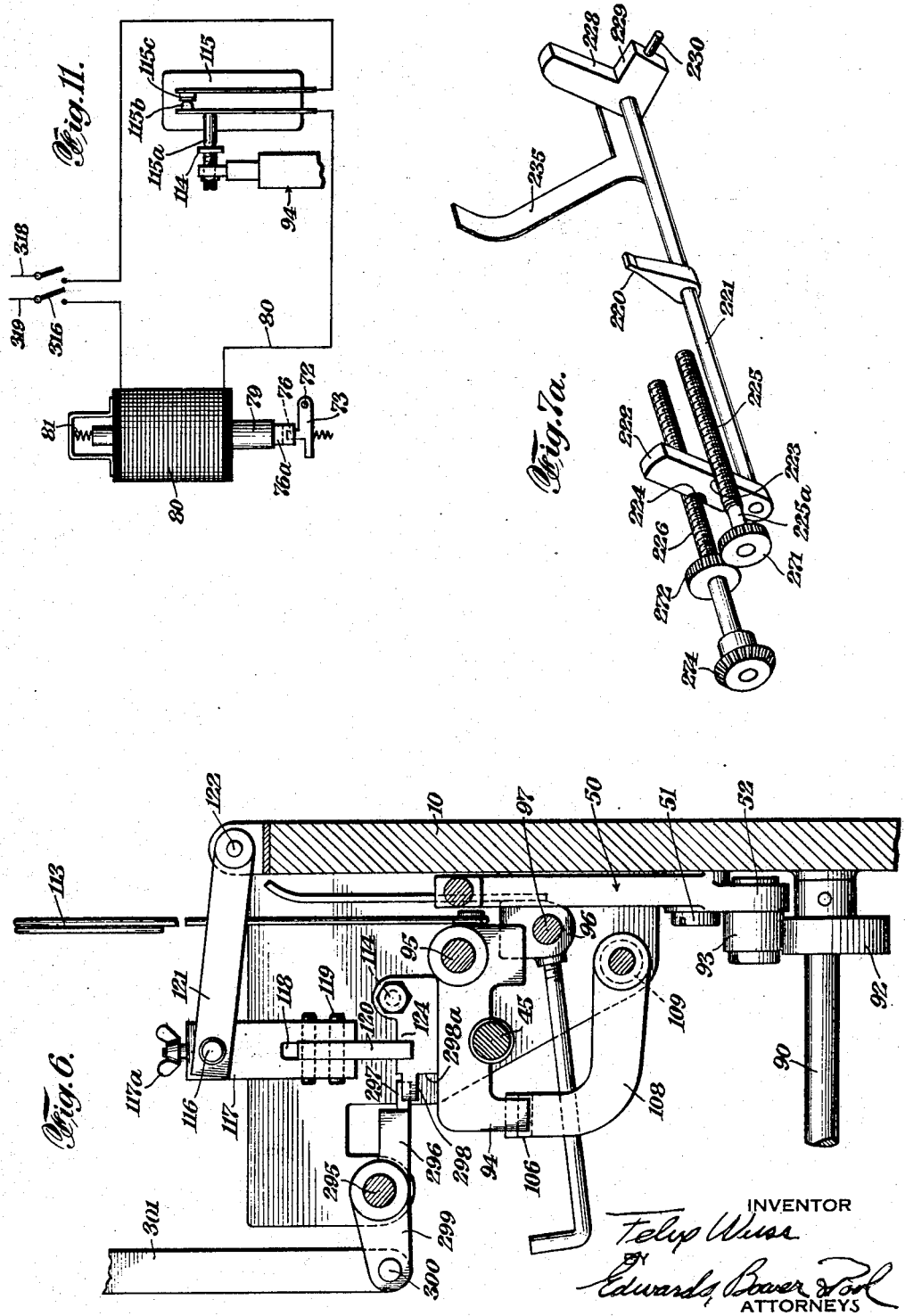
INVENTOR
Felyp Weiss
BY
Edwards, Bower & Pool
ATTORNEYS Nov. 11, 1952  F. WEISS  2,617,605
CONDENSER WINDING METHOD
Original Filed Sept. 12, 1944  11 Sheets-Sheet 8
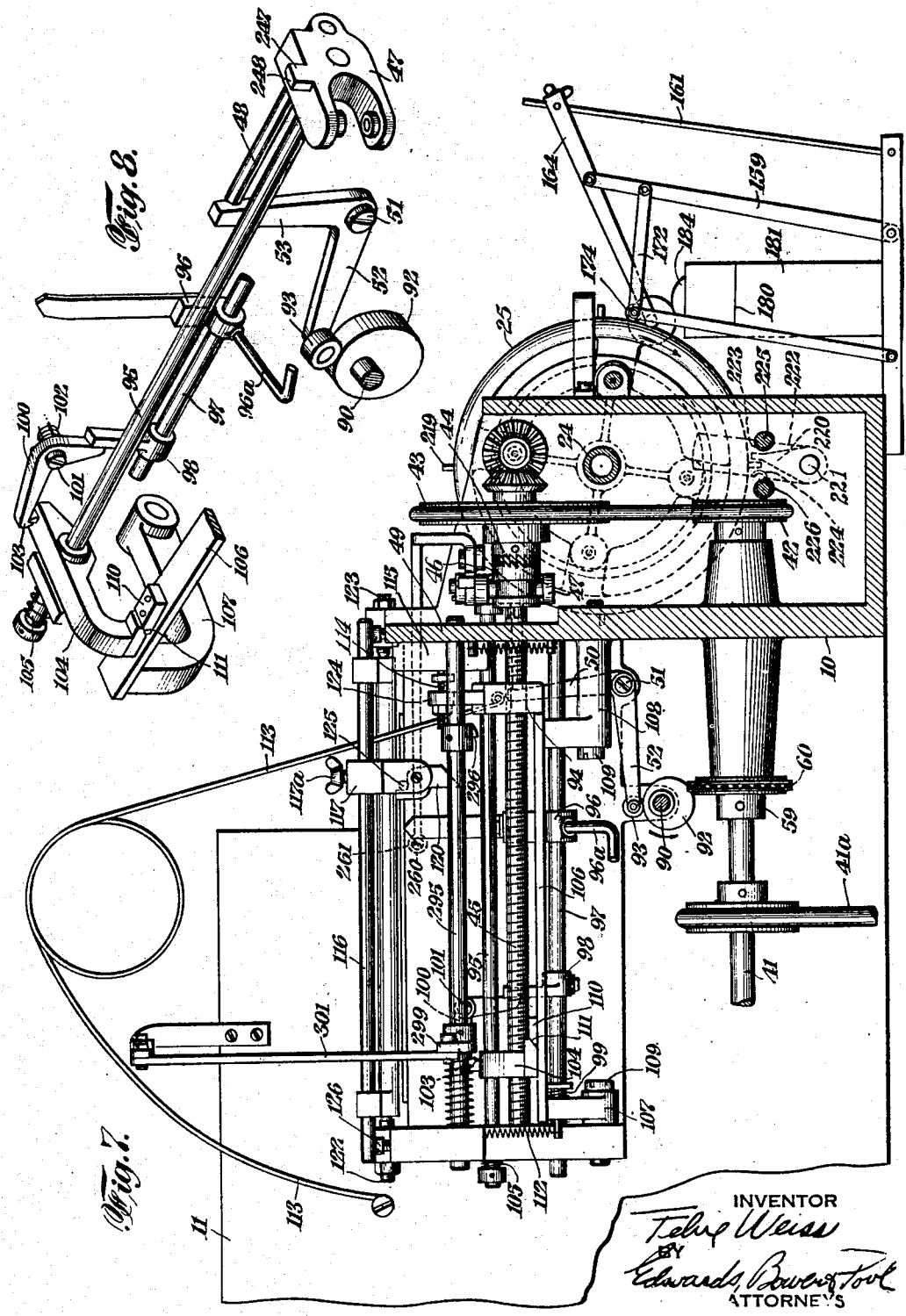

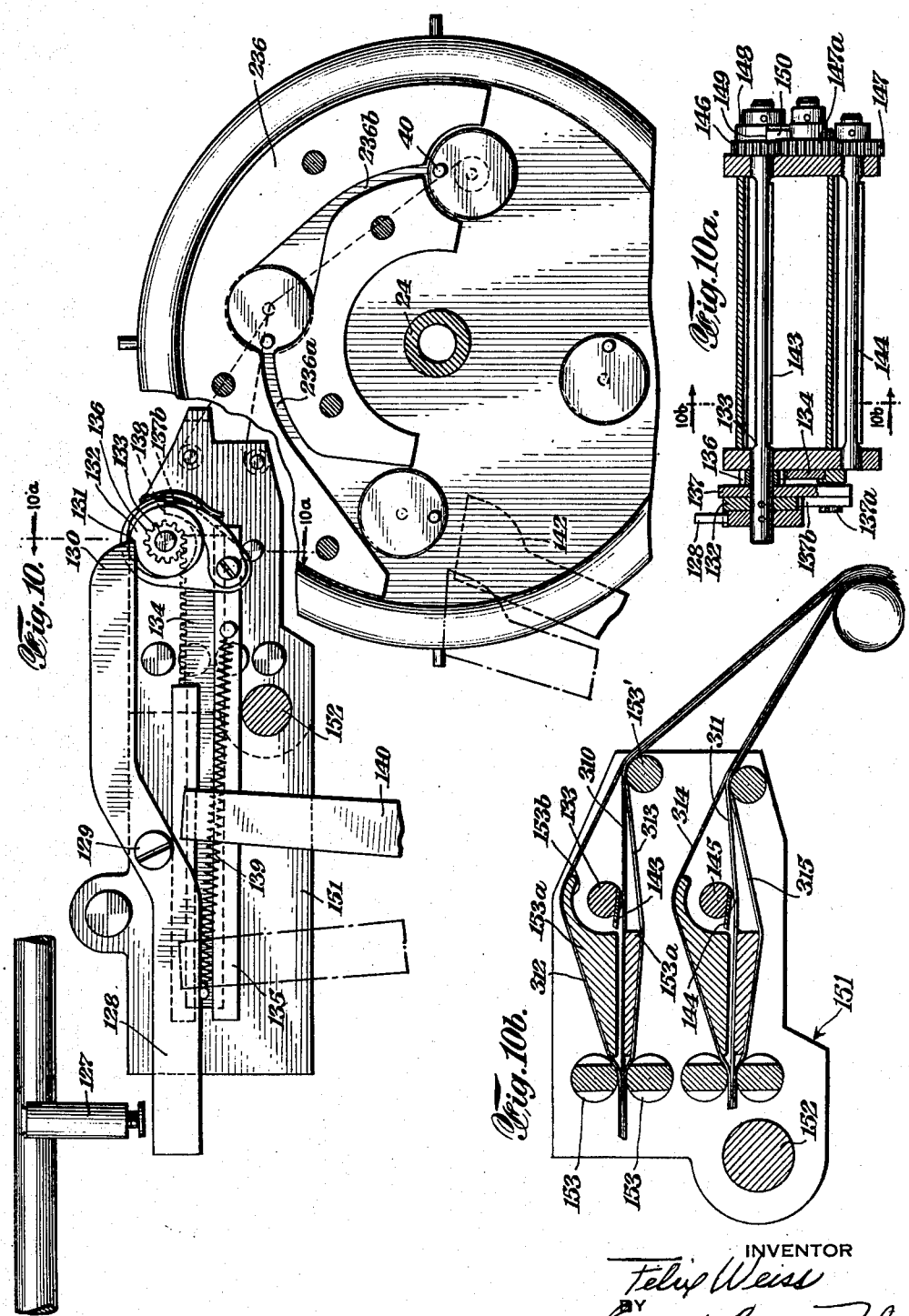

Nov. 11, 1952  F. WEISS  2,617,605
CONDENSER WINDING METHOD
Original Filed Sept. 12, 1944  11 Sheets-Sheet 10
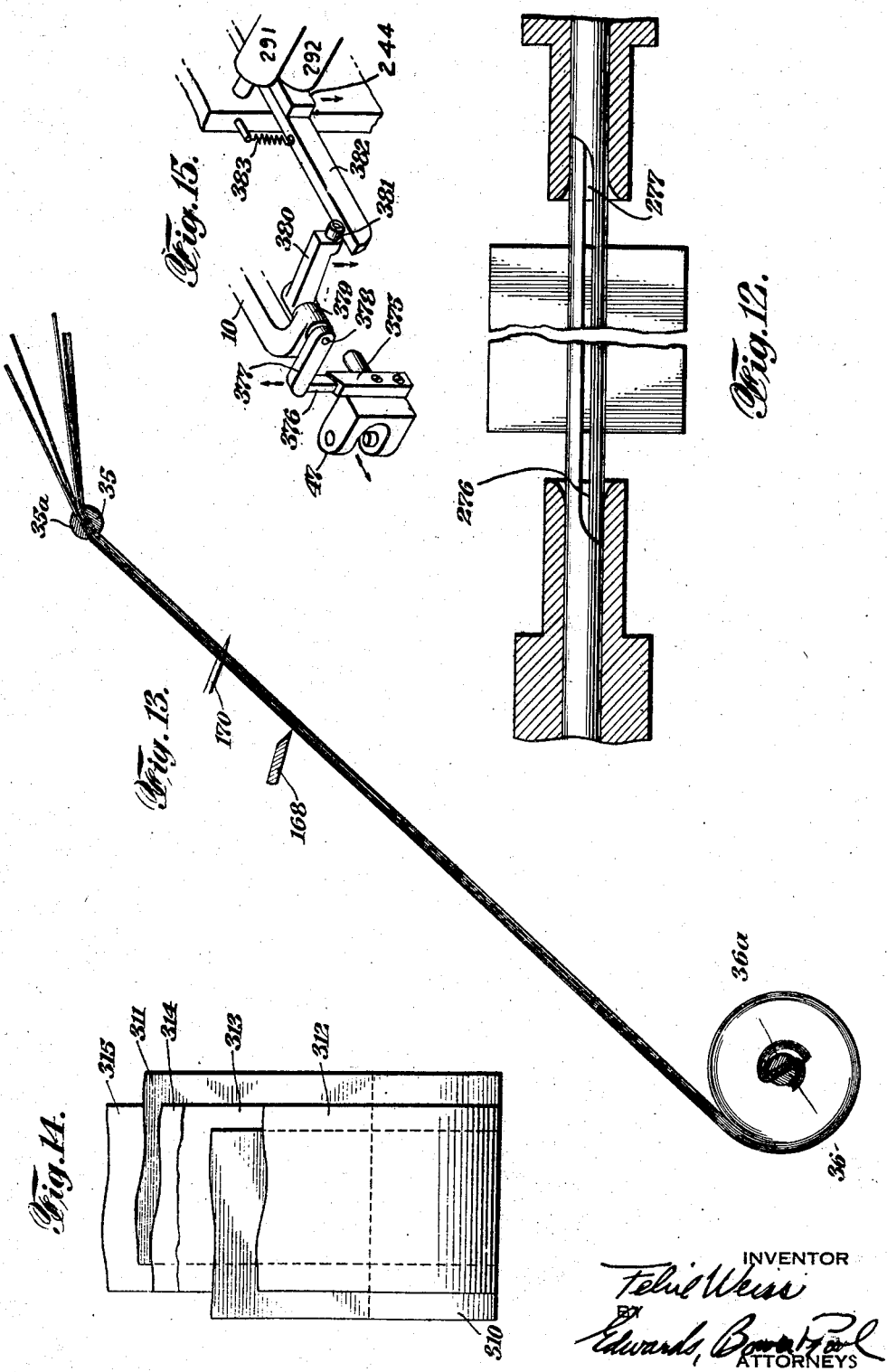

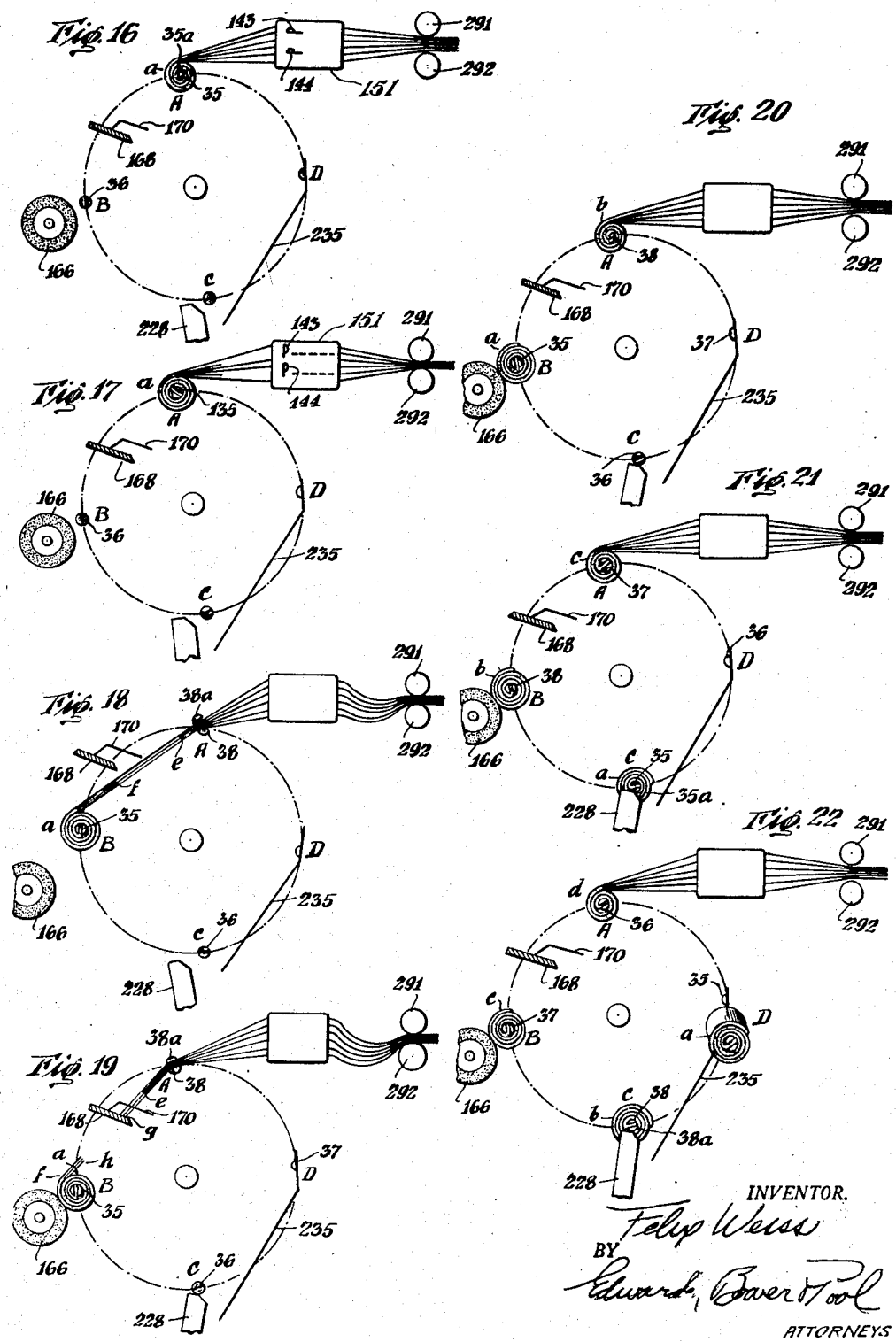

Patented Nov. 11, 1952

2,617,605

UNITED STATES PATENT OFFICE 2,617,605

CONDENSER WINDING METHOD

Felix Weiss, Brookline, Mass., assignor to Cornell-Dubilier Electric Corporation, a corporation of Delaware Original application September 12, 1944, Serial No. 553,773, now Patent No. 2,384,983, dated September 18, 1945. Divided and this application September 17, 1945, Serial No. 616,825

9 Claims. (Cl. 242—56)

This invention relates to methods of forming electrical condenser rolls.

An object is to provide for automatically feeding foil and paper into the machine, cutting the foil, creating a space between the foil ends and cutting the paper therebetween, automatically sealing and completing the roll-up of the strips, disengaging the mandrel and ejecting the completed condenser in a continuous succession of operations without interruption.

A related object is to provide a high rate of production while maintaining good precision of the condenser rolls and incurring a low rate of spoiling and breakage of material.

In carrying out the invention a system is provided whereby foil and paper are fed on to a mandrel and wound into rolls at one station, the foil being cut under tension after a predetermined number of turns at the time that the foil and paper are retarded by gripping the feed rollers, and the paper is thereafter cut between the separated ends of the foil upon the mandrel being carried around to a second station where the condenser is sealed and completed. The mandrel is thereafter moved to successive stations where the mandrel is removed and the completed condenser ejected, all in one continuous operation with the respective condenser operations being performed on different condenser rolls at all of the stations at the same time, and is automatically repeated and continued uninterruptedly and without any manual handling of the condensers.

One way to carry out the process of the invention is described in the following detailed description and shown in the accompanying drawings, of which:

Fig. 1 shows a plan view of the machine;

Fig. 1a shows a mandrel pin latching detail at line 1a—1a of Fig. 1;

Fig. 1b is a perspective view of a lever detail shown in Fig. 1;

Fig. 1c shows a detail of a clutch operating mechanism partially shown in Fig. 1;

Fig. 1d is a perspective view of a pivoted dog forming part of the mandrel indexing mechanism;

Fig. 2 shows a front elevation of the machine;

Fig. 3 is a side elevation in section of a part of the machine taken along line 3—3 of Fig. 1;

Fig. 5 is a sectional elevation taken along line 5—5 of Fig. 1;

Fig. 6 is a sectional elevation taken at line 6—6 of Fig. 1;

Fig. 7 is a rear elevation in section of a part of the machine taken along line 7—7 of Fig. 1;

Fig. 7a is a perspective view of a detail shown in Fig. 7;

Fig. 8 is a perspective view of part of the mechanism shown in Fig. 7;

Fig. 9 is an elevation in section of the part of the machine taken along line 9—9 of Fig. 1;

Fig. 10 is a detail looking through line 10—10 of Fig. 1;

Fig. 10a is a sectional view taken at line 10a—10a of Fig. 10;

Fig. 10b is a sectional view taken at line 10b—10b of Fig. 10a;

Fig. 11 is a wiring diagram showing the electrical switching and solenoid apparatus for operating a clutch shown in Fig. 1;

Fig. 12 is an enlarged view partially in section of a mandrel and mandrel pin used in the machine;

Fig. 13 is an enlarged view showing the position of the condenser strips and cutting and spiking mechanism during one of the positions of operation;

Fig. 14 illustrates the superimposed condenser strips leading to the condenser roll;

Fig. 15 illustrates a detail of an alternative modification; and

Figures 4, 4A:
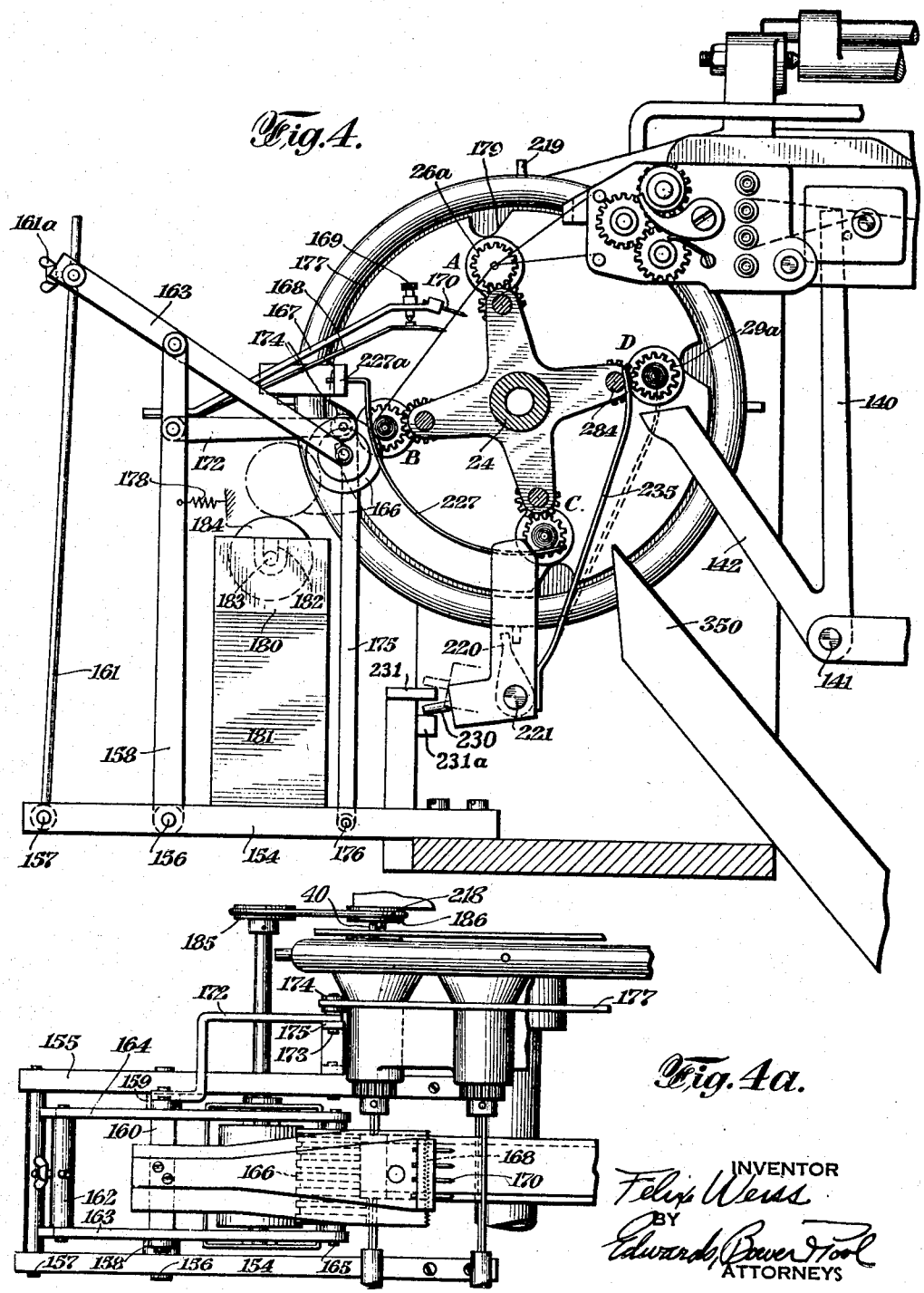
Fig. 4 is a front elevation of a detail taken along line 4—4 of Fig. 1.
Fig. 4a is a top view of the apparatus shown in Fig. 4.

Figs. 16 to 22, inclusive, are operational diagrams illustrating a sequence of operation performed by the machine.

Coil Winding Mechanism

Mounted on a frame 10, which supports the various parts, is a vertical panel 11 (see Fig. 2) which supports six pins 12 to 17, inclusive, carrying reels 12' to 17', respectively, which support rolls of metal foil and insulating material such as paper. Compression spider springs 18a, 19a, 20a, 21a, 22a and 23a are placed between the hubs of the rolls and respective collars 18b, 19b, 20b, 21b, 22b and 23b, for the purpose of applying a moderate amount of retardation against rotation of the rolls. Rolls 18, 19, 20 and 21 are rolls of paper or insulating strip and rolls 22 and 23 are of foil strip. At the front end of frame 10 there is journaled a shaft 24 (Figs. 1 to 3) to which is fixed a rotatable mandrel support in the form of a head 25 comprising four radial arms 26, 27, 28 and 29 and a rim 30. The four arms respectively carry four hubs 26a, 27a, 28a and 29a through which are journaled respective rotatable bushings 31, 32, 33 and 34 into which are fastened mandrels 35, 36, 37 and 38, respectively, by means of set screws; the conducting and insulating strips 310, 311, 312, 313, 314 and 315 from the insulating and conducting strip rolls being wound up on these mandrels. These mandrels are constructed as part-mandrels each being really half a mandrel in the form of a half cylinder having a flat surface through the longitudinal axis, which is adapted to cooperate with a similar flat surface of a cooperating part-mandrel, or pin, to hold the condenser strips therebetween. At the back end of each bushing, behind the head, there is formed a collar 39 provided with a driving pin 40.

For driving the mandrels there is provided a shaft 41 (Fig. 7) power driven from a belt 41a and having fastened to it a pulley 42 which is belted to a pulley 43 fastened to a clutch member 44, the pulley and clutch member being free to rotate on a shaft 45 which is journaled in the frame 10 (Figs. 1 and 7). Another clutch member 46 is splined on shaft 45, and movable endwise along the splines. For the purpose of engaging the two clutch members there is provided a fork 47 placed within a groove 47a of the clutch member 46 (Figs. 7 and 8), and the fork has fixed to it a rod 48 protruding through a head 49 fixed on the frame 10. A bell crank 50 is pivoted to the frame at 51 so that when the arm 52 of the bell crank is rotated clockwise (with reference to Fig. 8) its other arm 53 pushes against rod 48 to move the clutch member 46 into engagement with member 44, thereby causing shaft 45 to rotate.

There is journaled to the vertical wall of frame 10 a shaft 54 having fixed at its rear end a bevel gear 55 which engages with a bevel gear 56 fixed to the front end of shaft 45. At the opposite end of shaft 54 is a collar 57 with a driving pin 58 adapted to engage the pin 40 of whichever mandrel bushing collar 39 is placed in driving relation with pin 58.

The mandrel head 25 is rotatable counterclockwise (with reference to Fig. 2) in four successive steps of 90° each, during a full revolution, so that each mandrel is held for a time at each one of four successive stations A, B, C and D, spaced 90° apart, during a complete revolution of the head. During each successive one of these four steps, the next succeeding of the four mandrels is placed in driving relation with shaft 54.

*Mandrel indexing mechanism*

The 90° indexing movements of the indexing head 25 are carried out by the following mechanism: There is fastened to the power shaft 41 a sprocket 59 which drives by means of a sprocket chain 60 a sprocket 61 fastened to a shaft 62 (Figs. 1, 7 and 9). There is fastened to sprocket 61 a spur gear 63 which drives another spur gear 64 fastened to a shaft 65. Also fastened to shaft 65 is a worm 66 which drives a worm wheel 67 which is loosely rotatable on a shaft 68 (Fig. 9). On the hub of worm wheel 67 is fastened a clutch plate 69 containing internal teeth 70 (Figs. 1 and 1c). There is fastened on shaft 68 a gear 71 having mounted on its hub a pivot 72 on which is pivoted a dog 73 having a projection 74 adapted to engage the internal teeth 70 whenever the dog is released to make the engagement. The dog is normally held in engagement with the teeth by means of a spring 75. On top of the dog is a boss 76 having a bevel 76a (Fig. 1d) leading up to a lug 76b adapted to be engaged by an arm 77 attached to the plunger 79 of a solenoid 80. A compression spring 81 (Fig. 11) holds the arm in its position in the path of boss 76 so that when the boss moves under the arm 77, the bevel 76a travels under the lower edge of this arm to depress the dog and disengage its clutch teeth. When the lug 76b engages the side of arm 77 the dog and its gear 71 stop rotating. When solenoid 80 is energized, however, the arm is pulled out of engagement with the dog, thereby permitting the dog to rotate under action of spring 75 to engage the clutch teeth.

Also mounted on shaft 68 is a Geneva arm 82 having a pin 83 adapted to engage with the radially extending Geneva slots 84 of a Geneva plate 85 which is fixed to the indexing shaft 24 to which the indexing head 25 is attached. The Geneva plate is provided with four arcuate hubs 86, one being located between each adjacent pair of slots; and the radius of curvature of each of these hubs is equal to the radius of the circular portion of the hub 87, so that when the indexing head 25 is indexed in any one of the four stations, hub 87 engages the corresponding one of the four hubs 86 to lock shaft 24 against rotation. The circular hub 87 of arm 82 is provided with an arcuate cut-out 87a to provide clearance for the extremities 86a of the hubs 86 when the Geneva arm is rotated to rotate the Geneva plate.

Fixed to shaft 68 is a sprocket wheel 88 which drives a sprocket wheel 89, fixed to a shaft 90, by chain 91, the gear ratio being one-to-one so that there is one revolution of shaft 90 for each revolution of shaft 68. Fastened on shaft 90 is an eccentric 92 on which rides a roller 93 journaled on the end of bell crank arm 52 (Fig. 8). The eccentric 92 is so related to the Geneva arm that the eccentric turns the bell crank to engage the clutch member 46 with clutch member 44 just after the Geneva pin 83 has swept through the Geneva slot to complete the 90° indexing movement of the head 25.

*Turns counting mechanism*

For determining the number of turns of paper and foil strip to be wound on the mandrels for each condenser roll, there is provided a turns counting mechanism (Figs. 1, 5, 6 and 7). This comprises a half nut 94 slidably pivoted at one side thereof on a rod 95 and engaging the threaded shaft 45 so that when the clutch members 46 and 44 become engaged to roll up the condenser the nut travels to the left (with reference to Fig. 7) until it strikes a stop 96 adjustably fastened to a slidable bar 97 by a set screw 96a. There is fastened near the end of bar 97 a dog 98 and a compression spring 99, so that when the stop is pushed by the half-nut, bar 97 is moved endwise against the compression of the spring, and the dog rotates a bellcrank 100, pivoted at 101, against the force of a helical spring 102, thus lifting a catch 103 on the bellcrank from engagement with a head 104 which is fixed to rod 95. The other end of rod 95 is attached to the clutch fork 47. When the catch 103 is lifted from head 104 the latter springs to the left (with reference to Fig. 7) by action of compression spring 105 and thus disengages the clutch member 46 from 44.

A bar 106 is mounted by supports 107 and 108 on rotatable pins 109, and bar 106 has a member 110 with a bevel 111. The under surface of head 104 is adapted to move sideways on and off of member 110 along the bevel 111, so that when the head springs to the left, the head moves off member 110 and allows bar 106 to move up under action of spring 112, thereby lifting the half-nut out of engagement with the threads on shaft 45 by pivoting the half-nut on bar 95 and permitting the half-nut to slide rapidly home to its initial position where it drops off the right end of bar 106 (Fig. 7) and on the screw shaft 45, by the action of hairpin spring 113 which is attached at one end to the half-nut and at the other end to the frame. A bolt 114 is mounted on the half-nut and a switch 115 having an operating knob 115a is fastened to the frame so that when the nut reaches home the bolt 114 pushes the switch knob which closes switch contacts 115b and 115c to close the circuit through solenoid 80 as long as the nut is home (see wiring diagram, Fig. 11). This pulls arm 77 out of engagement with boss 76, thereby causing dog 73 to engage with clutch teeth 70.

Foil strip severing mechanism

To sever the foil and paper strips during the indexing operation after each mandrel winding, there is provided the following mechanism: There is mounted on a bar 116 (Figs. 6 and 7) a member 117 which has a slot 118 containing a pin 119 on which is pivoted a beveled cam 120. The position of member 117 on bar 116 is adjustable, and the member is fastened in position by a set screw 117a. Bar 116 is part of a frame 121 which is pivoted at 122 and 123 to the main frame 10. The arrangement is such that shortly before the half-nut 94 traveling along shaft 45 strikes stop 96, a camming member 124 mounted on the half-nut engages the pivoted cam 120, moving it against a stop 125, and thereby lifting bar 116 while the nut passes by; after which the bar drops down again on its support 126 (Fig. 5). When the nut returns home it simply kicks the freely pivoted cam 120 in the opposite direction without lifting the bar. Frame 121 has an arm 127 (Fig. 5) which engages the rear end of a latch lever 128 which is pivoted at 129 (Fig. 10), so that when bar 116 is lifted arm 127 is depressed, pivoting the latch to disengage its end 130 from the shoulder 131 of a collar 132 which is fastened to a shaft 133. Shaft 133 is journaled in a cradle or cutter box 151 (Figs. 10, 10a and 10b) mounted on a pin 152 which is held on an arm 152a which in turn is attached to a pin 152b fastened to the frame. Set screws holding the arm 152a to the pins 152 and 152b provide for adjustment of the position of the cradle. Shaft 133 is torque-tensioned by means of a rack 134 slidable in a slide 135 and in engagement with a pinion 136 freely rotatable on shaft 133. Pinion 136 has fastened to it an arm 137 having pivoted on it at 137a a pawl 137b which engages a shoulder 138 on a collar 132 which is fixed to shaft 133. Rack 134 is moved against the tension of a spring 139 by an arm 140 of a bellcrank pivoted at 141, the other arm 142 of which is engaged by the mandrel hubs (Fig. 4) so that at every indexing operation the rack is thus pushed to the left (Fig. 10) which rotates pinion 136 and pawl 137b clockwise until the pawl engages shoulder 138. Under this condition spring 139 is in tension. Then when end 130 of latch 128 is disengaged from shoulder 131, shaft 133 rotates one revolution counterclockwise under the influence of the rack spring until the collar shoulder 131 is again engaged by the latch 130 which in the meantime has dropped again. Shaft 133 has attached to it a knife 143 which operates to cut the foil strip 310 passing under it. Another similar knife 144 attached to a shaft 145 which is geared to shaft 133 by pinions 146 and 147, meshed through an idler pinion 147a, operates at the same time to cut the other foil strip.

To prevent backlash during the tensioning of the rack spring 139 there is attached to shaft 133 a collar 148 having a shoulder 149 engageable by a backlash pawl 150.

The cradle 151 is provided with a number of transverse pins 153 at the rear end and 153' at the forward end and guides 153a between which the condenser strips pass in going from the rolls to the mandrel, as shown in Fig. 10b; and the cutting knives are adapted to rotate within arcuate cut-outs 153b of the guides. To prevent the insulating strips from being cut, they are led through guide spaces out of reach of the knives, as shown. The pins 153 bearing against the strips exert a frictional drag with consequent tensioning of the strips on the way to the wind-up mechanism.

Up to the point where the strips reach the parting guides 153a each foil strip is held and supported between insulating strips so that the relatively weak foils will not wrinkle or become injured during the feeding operation; and after passing the forward ends of guides 153a the foils again become supported when they are brought together between the insulating strips at the forward pins 153'.

Insulating strip severing and pasting mechanism

There are mounted on the frame a pair of rigid beams 154 and 155 spaced somewhat apart and having extended between them a pair of pins 156 and 157 (Figs. 4 and 4a). Pivoted on pin 156 are a pair of uprights 158 and 159 which have extending between their upper ends a pin 160. Pivoted on pin 157 is an upright member 161, the upper end of which is fastened by a set screw 161a, for adjustment, to a pin 162 which extends between a pair of spaced bars 163 and 164. These two bars 163 and 164 are pivoted on pin 160 at a position forward of pin 162; and the front ends of these two bars carry pin 165 on which is freely rotatable a grooved roller 166.

There is rigidly fastened to bars 158 and 159 a rigid bar 167 having attached beneath it a spring knife 168. An adjusting screw 169 threaded through bar 167 serves to position the knife. One or more needles 170 projects forwardly from bar 167.

Fastened to member 159 is an arm 172 having at its front end a pin 173 on which is a freely rotatable roller 174. Also mounted on the pin 173 is the upper end of a lever 175 which is pivoted at its lower end to the frame at 176. Roller 174 is continuously urged, by means of a spring 178, into contact with a cam 177 fastened to the indexing head so that when the indexing head is indexed in any one of its four indexing positions the roller 174 enters the corresponding one of four indents 179 of the cam 177.

A container of paste 180 is mounted on a stand 181 and the ends of the container are slotted at 182 to receive pins 183 at the ends of a roll 184 adapted to rotate in the paste to smear the paste over the surface of the roll. The rear pin of the roll has mounted on it a pulley 185 which is belted to a pulley 186 fastened near the front end of a shaft 187. Shaft 187 is journaled on the frame and driven from shaft 68 by a train of gears 71, 189, 190 and 191, gears 71 and 191 being fixed respectively to shafts 68 and 167, and gears 189 and 190 being idlers (Figs. 1 and 9).

Whenever the indexing head with its cam 177 is rotated through one of its 90° indexing movements, the roller 174 rides out of the indent on the surface of the cam, thereby rotating uprights 158 and 159 counterclockwise (with reference to Fig. 4) and correspondingly rotating upright 161. Since the length of upright 161 is greater than that of 158 and 159, the effect of this rotation is to move arms 163 and 164 to bring the roller 166 into contact with the paste roll 184, as shown in dotted lines, to smear paste on roller 166. Then when roller 174 drops into the next indent 179, corresponding to the next indexing position, roller 166 springs back again to its normal position with its grooves in engagement with curved wiper wires 227 which are fixed to the frame at 227a, and smearing the paste on the rolled condenser which has just moved down from the winding station A to station B where the roll is in engagement with the wipers 227.

When the roller 174 drops into the indent 179 in station B, the needles 170 spike the insulating strips which now extend from across the mandrel in winding station A to the roll in station B; and an instant later the knife 168 severs them.

*Condenser roll-up and ejecting mechanism*

Mounted on the frame 10 at some distance in front of the indexing head is a fixed bearing 192 through which is journaled the indexing shaft 24 (Figs. 1 and 3). Shaft 24 has attached to it a pair of supports 193 and 194, support 193 having four radial arms 195, and support 194 (Fig. 3) having four similar radial arms 195a. Journaled through the corresponding arms 195 and 195a are four barrel shafts 196, 197, 198 and 199 having fastened to their respective ends the four mandrel pins 35a, 36a, 37a and 38a, which are constructed as part-mandrels having flat surfaces and adapted to cooperate respectively with part-mandrels 35, 36, 37 and 38. These mandrel pin shafts are aligned with respect to the corresponding half-mandrels extending from the indexing head so that the flat surfaces of the cooperating half-mandrel pins face the corresponding flat surfaces of the half-mandrels (Figs. 12 and 13) when the two are brought together. The barrel shafts are slidable endwise through bushings in their supporting arms so that the disengagable part-mandrels, or pins, may be engaged and disengaged endwise of the related part-mandrels.

On each arm of support 194 is a pivoted latch 200, which is urged in its latching direction by a leaf spring 201, and each mandrel pin shaft has fixed on it a shoulder 202, the arrangement being such that when a barrel shaft is slid endwise to the extreme right (with reference to Fig. 3) it is held in that position by the latch 200 engaging the shoulder 202 until the latch is released in the winding station A by its knob 203 coming into engagement with a cam 204 fixed under the top of an arch 205 which is fastened to the frame (Fig. 1a).

In front of support 194 there is fastened to the shaft 24 another support 206 having four radial arms 207, each of these radial arms having a slot 208. There are placed across the slot a pair of pins 209 and 210 on which are freely rotatable pulleys 211 and 212, respectively. Spaced somewhat from support 206 and also fixed to shaft 24 is a head 213. There is passed over each pulley a spring 214 one end of which is fastened to the head 213 at 215, and the other end of which is fastened to a collar 216 freely mounted on the corresponding barrel shaft 196 and held against a shoulder 217 in the shaft. The springs 214 are maintained in tension so that when the latch 200 releases shoulder 202 at station A, the mandrel pin slides into engagement with the mandrel (with the condenser strips between the half-mandrel and pin) and enters recess 276 at the front of the mandrel (Fig. 12); and at the same time recess 277 at the end of the barrel shaft receives the end of the mandrel. This places the mandrel in readiness to roll a condenser.

To insure that when a mandrel goes from station D to station A, the flat surface of the half mandrel shall face up to receive the condenser strips, there is fixed to the frame behind the mandrel support a cam 236 having a cam groove 236a which receives pins 40 on the mandrel bushings to hold the bushing at the proper angle of rotation to bring the flat mandrel face up in position A (Figs. 1, 3 and 10). This cam has another groove 236b through which pin 40 travels while the mandrel is moving from station A to station B, to keep the wound mandrel from unwinding during this movement.

To insure that the flat surface of the mandrel pin shall always face the flat surface of the mandrel when latch 200 is released at station A, there are provided correlating shafts 282, 283, 284, and 285 journaled in the arms of supporting members 193 and 194 and of a supporting member 286, and parallel with the four mandrels and the four barrel shafts 196, 197, 198 and 199, respectively. Each correlating shaft is geared to the respective mandrel by pinions 287 and 288 fastened to the respective mandrel and correlating shaft; and to the respective barrel shaft by fluted gear 289 and pinion 290 fastened respectively to the correlating and barrel shafts. This arrangement is such that the pinion 290 slides along the fluted gear when the barrel shaft slides; and this gearing maintains the flat face of the mandrel pin always toward the flat face of the mandrel.

To roll up the loose strip ends, or "flag," left trailing from a roll on a mandrel at station B after the severing of the insulating strips the shaft 187 carries at its front end a driving pin 218 adapted to engage the pin 40 on the mandrel bushing of that mandrel (Fig. 4a). Rotation of shaft 187 thus operates to continue the rotation of the mandrel after it is indexed in the B station with the paste already applied to the strips, and thus wind up the loose ends or "flag" to paste it in position. The gearing of shaft 187 is so arranged that shaft 187 stops its wind up rotation to leave the pin 40 above the mandrel shaft (substantially as shown in Fig. 10) so that when the rolled mandrel finally moves from stations D to A the pin will be following the mandrel shaft as the pin travels within groove 236a. This insures that the flat part of the mandrel will face up as the mandrel enters station A.

After the next subsequent indexing movement, the condenser winding which has just had its "flag" wound and pasted is carried down to the lowermost station C, and in thus traveling downward rubs against the wiper wires 227, which prevents any unwinding of the condenser during this downward movement.

The rim of the indexing head is provided with four radially extending pins 219 located adjacent the respective mandrels. Each time the head is indexed, the pin 219 corresponding to the mandrel in station C, strikes an arm 220 fixed to a shaft 221 which is journaled in the frame and slidable endwise (Figs. 3 and 4). The rear end of shaft 221 has fixed to it a compound half-nut 222 having two sets of internal threads 223 and 224 (Figs. 7 and 7a). Two threaded lead screws 225 and 226, also journaled in the frame in parallel relation to the shaft 221, are located adjacent the respective half-nut portions 223 and 224, and the two lead screws are geared together by the spur gears 271 and 272 which are fastened respectively to shafts 225 and 226. The lead screws are driven from shaft 65 by bevel gear 273 on shaft 65 in engagement with bevel gear 274 on shaft 226. The arrangement is such that when shaft 221 is rotated a few degrees in one direction the half-nut portion 223 engages the lead screw 225, and when shaft 221 is rotated in the opposite direction the half-nut portion 224 engages the other lead screw 226. The right end of shaft 221 (with reference to Fig. 3) has fixed to it a bellcrank 228, the horizontal leg 229 of which is weighted to hold shaft 221 in its most clockwise position of rotation (with reference to Fig. 7), thus keeping half-nut 222 in engagement with lead screw 225. Lead screw 225 has at its rear end an unthreaded portion 225a, and the threads of the threaded portion are cut in the direction which causes the half-nut, when engaged therewith, to move to or remain at the unthreaded end 225a, thus keeping shaft 221 in its leftmost endwise position (with reference to Fig. 3). But when pin 219 on the indexing head strikes arm 220 the shaft 221 is rotated until the half-nut portion 224 strikes the other lead screw 226. This has its threads cut to feed the half-nut in the opposite direction, causing shaft 221 to slide to the right (with reference to Fig. 3). A pin 230 fixed on arm 229 rides along a platform 231 which is fastened to the frame, thus keeping the half-nut in engagement with lead screw 226 until the pin drops off the right end of the platform, as shown in Fig. 3.

When the half-nut first engages the forward lead screw 226, in the rearmost position of the half-nut, the vertical arm of bellcrank 228 engages the shoulder 232 on the sliding barrel shaft which is in station C. Then when shaft 221 slides to the right it also slides the barrel shaft to the right against the tension of springs 214 until the barrel shaft latches at its shoulder 202, thus leaving the roll 280 on the fixed half mandrel. To keep the condenser roll from being pulled off the fixed half-mandrel when the sliding half-mandrel pin is extracted, an arm 400 fixed to the frame is positioned to obstruct any movement of the condenser roll in an endwise direction. Pin 230 then drops off the right end of platform 231 (with reference to Fig. 3) on to sub-platform 231a so that the weighted arm 229 rotates shaft 221 back to its normal position, engaging the half-nut portion 223 with the return lead screw 225 which slides the shaft 221 to the left until the half-nut runs off the threads in the initial position again. In thus sliding to the left pin 230 slides along sub-platform 231a and continues to rest on it when back in the initial position.

When a wound roll left on a half-mandrel reaches station D, it is removed from the half-mandrel by means of an arm 235 fixed to shaft 221. This arm is of springy metal and is normally in the full line position of Fig. 4. But when a mandrel moves from station C to station D the mandrel engages the arm 235 at a place just back of the rolled condenser and springs out the arm to the position shown in dotted lines in Fig. 4. Then when shaft 221 is rotated to engage the half-nut with the forward lead screw, the upper end of this arm 235 moves along the mandrel behind the condenser, thus pushing the rolled condenser off the half-mandrel. After the condenser is ejected the arm 235 springs back to its original full line position.

*Strip advancing mechanism*

For the purpose of providing a positive feed of the foil and paper strips to the driven mandrel, at the beginning of a winding, there are provided feed rollers 291 and 292 (Figs. 1, 2 and 5) between which the condenser strips are passed. Roller 291 is an idler and roller 292 is connected with a telescoped shaft 237 through a universal joint 238, the other end of the shaft being joined through another universal joint 239 to a pinion shaft 240 having fixed to it a pinion 241. Pinion 241 is driven from pinion 242 which in turn is driven from a pinion 243 fixed to the end of the indexing shaft 24. Roller 292 is rotatable on a pin which is fixed in a frame 244 and is movable upward to a binding position against roller 291 by means of a pin 245 protruding from the main frame 10 on which frame 244 pivots. The opposite end of frame 244 is weighted by a weight 246 which tends to keep the roller in binding position.

The roller is operated into and out of binding position by the following mechanism (Figs. 1, 2 and 5). A cam arm 247 having a bevel 248 is fixed to the clutch fork 47. There is pivoted to the frame at 249 an arm 250 (Fig. 1b) which carries on it a pin 251 on which is freely rotatable a bellcrank 252, one arm 253 of which is beveled at 254 and the other arm 255 of which is adapted to engage a stop 256 fixed to lever 250. A tension spring 257 attached at one end to the bellcrank arm 252 and at the other end to a pin 258 fixed on lever 250, tends to keep the bellcrank turned against stop 256. Lever 250 has fastened to it an arm 259 to the other end of which is fastened a knob 260. Opposite the knob 260 is a bellcrank 261 (Fig. 5) pivoted to the frame at 262 having a pair of shoulders 263 and 264 positioned to engage the front end of lever 244. A tension spring 265 fastened to arm 259 tends to keep arms 250 and 259 rotated counterclockwise (with reference to Fig. 1) on pivot 249 to keep knob 260 withdrawn from bellcrank 261. The organization is such that when the clutch member 46 disengages from clutch member 44, cam 247 in moving by cam 254 of bellcrank 253, pushes bellcrank 253 against pin 256, thus rotating arm 259 clockwise (with reference to Fig. 1), on pivot 249 and consequently rotating bellcrank 261 so that lever 244 is released from the lower shoulder 264. This causes frame 244 to rotate under force of weight 246 until it strikes the upper shoulder 263, thereby causing the roller 292 to be brought up to binding relation against the strips held between rollers 291 and 292. In this position, rotation of drive shaft 237 by means of shaft 24 drives the roller 292 to feed the strips toward the mandrel.

When clutch member 46 moves to re-engage with clutch member 44, cam 247 merely rotates bellcrank 252 counter-clockwise (Fig. 1) against the force of spring 257 without affecting arm 259 or bellcrank 261.

For the purpose of releasing feed roller 292 from its binding engagement of the condenser strips against roller 291 after the first couple of turns of the mandrel winding, there is provided a release. This comprises (referring to Figs. 1, 5 and 6) a shaft 295 rotatably journaled in the frame, to which is attached an arm 296, carrying a camming projection 297. The half-nut 94 has mounted on it a corresponding camming projection 298 adapted to engage cam 297 so that after the half-nut travels along the screw shaft 45 a distance corresponding to a small number of mandrel turns, cam 298 lifts up cam 297 and thus rotates shaft 295 counterclockwise (Fig. 6) while the half-nut is passing, after which shaft 295 rotates back to its original position. There is fastened to shaft 295 an arm 299 carrying a pivot pin 300 on which is pivoted an arm 301. The upper end of arm 301 contains a pin 302 (Fig. 5) on which is pivoted a lever arm 303 having its fulcrum on a pivot pin 304 attached to a bracket 305 which is fastened to the frame. The opposite end of lever 303 carries a pin 306 on which is pivoted an arm 307 depending down to a pin 308 attached to the frame 244 of roller 292 (Figs. 2 and 5), so that every time shaft 295 is rocked by the traveling half-nut, the frame 244 is rotated a few degrees counterclockwise on pin 245 (with reference to Fig. 2) which moves the forward end of frame 244 from shoulder 263 down to the lower shoulder 264 on bellcrank 261, thereby holding feed roller 292 disengaged from the condenser strips.

Operation

Before starting the machine the foil and insulating strips are led between the feed rollers 291 and 292 and pulled over the half mandrel in station A while holding the mandrel pin retracted, the foil strips 310 and 311 being led through the guides of the foil cutter which take them in the path of the foil cutters, and the insulating strips 312, 313, 314 and 315 through the guides which avoid the foil cutters. According to usual condenser winding practice, all four insulating strips overlie each other. Furthermore, one edge of one foil strip 310 may, if desired, be placed beyond one side of the insulating strips and the opposite edge of the other foil strip 311 may be placed beyond the other side of the insulating strips, the remaining foil edges being sandwiched within the insulating strips, as shown in Fig. 14.

To start the machine, the power driven shaft is rotated by turning on its source of power, and the circuit of solenoid 80 is established by closing switch 316 connecting it with the electrical power wires 318 and 319 (Fig. 11). As the half-nut 94 will be at rest in its home position, switch 115 will be closed, producing energization of solenoid 80. This will engage dog 73 with clutch teeth 70 to produce a revolution of shaft 68, during an early part of which Geneva pin 83 sweeps through a Geneva slot 84 (Fig. 9) to produce a 90° indexing rotation of shaft 24 bearing mandrel head 25. Also, during this indexing movement the mandrel hub on head 25, which moves from station C to station D strikes bellcrank arm 142 to pull rack 134 to the left (Fig. 10) thus tensioning it by the engagement of arm 130 against shoulder 131. Immediately upon completion of the 90° indexing rotation of shaft 24, latch 200 (Figs 1a and 3) is operated by fixed cam 204 to allow the barrel shaft 196 to spring toward the mandrel which has just moved from station D to station A, to slide the half-mandrel pin over the condenser strips which lie across the half-mandrel.

Just after the completion of the indexing movement, which occurs during an early part of the revolution of shaft 68, bellcrank 50 is rotated by cam 52 to engage clutch member 46 with 44 (Figs. 8 and 9) and thus start the mandrel in station A rotating and the half-nut 94 traveling along screw 45. This causes the contacts of switch 115 to open and deenergize the solenoid 80, allowing spring 81 to urge arm 77 into the path of lug 76 on dog 73 (Fig. 1c). Shortly thereafter lug 76 engages arm 77, thus disengaging the dog from clutch teeth 70 and stopping the rotation of shaft 68 which has now completed its one revolution.

The rotation of the mandrel rolls up the strips pulling them from their respective supply rolls against the retarding effect of the compression springs pushing against the hubs of the supply rolls. When the mandrel winding is almost completed, the cam 124 on the half-nut (Figs. 6 and 7) strikes cam 120, lifting bar 116 off support 126 to pivot latch 128 away from shoulder 131 of collar 132 (Fig. 10). This allows rack 134 to spring endwise to rotate the knife shafts 133 and 145 to sever the foils while they are traveling toward the mandrel. After this severance the foil rolls cease to feed any more foil strip to the mandrel and only the insulating strips continue to feed, so that a space opens up between the severed foil ends. Then, after a desired space of, for example, a few inches has opened up between the severed foil ends, the traveling half-nut strikes stop 96, sliding bar 97 to the left (Fig. 7) and releasing catch 103 from engagement with head 104. This allows head 104 to spring to the left (Fig. 7) and disengage clutch member 46 from 44 to stop the mandrel winding, and at the same time to allow bar 106 to rise and thus lift the half-nut off screw 45; and the half-nut then immediately springs back to its initial home position. The disengaging movement of clutch member 46 and its fork 47 causes cam 247 to rotate lever 259 which rotates bellcrank 261 to disengage shoulder 264 from feed roller frame 244 (Fig. 5), and thus allow roller 292 to bind the strips against roller 291 in preparation for the next indexing movement and condenser winding.

When the half-nut reaches home its bolt 114 closes the switch 115 which energizes the solenoid 80 to engage the dog 73 with the internal teeth 70 of the one-revolution clutch. This rotates the indexing head through another 90 degrees, advancing the condenser just rolled to station B and pulling the insulating strips across the flat surface of the half-mandrel which is moving up from station D into station A, as shown in Fig. 10. Just as soon as the mandrel now to be wound reaches station A, the catch 200 holding shoulder 202 engages cam 204, which releases the catch and causes the half-mandrel pin to slide over the condenser strips across the half-mandrel, as shown in Fig. 4. The position of the foil knives is such that when the mandrel is thus set for winding, the leading edges of the foils from the foil rolls just extend through the mandrel, as shown in Fig. 13.

During the revolution of shaft 24 the feed roller 292 which is still binding the strips against roller 291, is rotated by shaft 237 and gears 241, 242, and 243, which are driven by shaft 24 (Fig. 1) to feed the strips toward the mandrel;

and it preferably feeds a somewhat greater length of strips than is required to supply the travel from station A to station B, so that the strips hang in a slight loop between the feed rollers and the pins of the foil cutter; after which the beginning of the mandrel winding tensions the strips against the resistance of the said pins and draws the strips forward and pulls out this loop.

Also at the beginning of the indexing movement, roller 174 (Fig. 4) is pushed out of the indent 179 in which it had been resting, on to the outer periphery of cam 177 to retract the knife 168 from the path of the wound condenser moving to station B; and just as it reaches station B, at the end of the indexing movement, roller 174 drops into the next indent 179, causing needles 170 to spike the insulating sheets at the area unoccupied by the foil sheets, and causing knife 168 an instant later to sever the insulating sheets at a place between the foil ends, but below the spot where the pin 170 has just spiked the strips to keep them in place after the severing. This is illustrated in Fig. 13.

Simultaneously with this severing operation, roller 166 (Fig. 4) which had been brought into contact with the paste roll 184 while roller 174 was on the outer periphery of cam 177, is brought into contact with the condenser roll at station B, which immediately upon reaching station B, begins to turn to roll up and paste the "flag" due to the engagement of driving pin 218 with pin 40 of the mandrel in this position. The mandrel continues to be rotated for a number of turns in this manner because shaft 187 which is driving it continues to be driven from shaft 68 through train of gears 189, 190 and 191 until dog 73 disengages from clutch teeth 70; and since it takes only about 90 degrees of a revolution of shaft 68 to complete the indexing movement, there remains about 270 degrees for it to continue to drive shaft 187 after the indexing is completed and while the mandrel at station A is being wound. As the roll at station B is in contact with the springy wiper wires 227 at station B, these wires cause the flag to roll up tightly.

Just before the end of a full rotation of shaft 68, eccentric 92 on shaft 90 operates bellcrank 50 to engage clutch member 46 with 44 again, and simultaneously to shift bar 97 and head 104 to the right (with reference to Fig. 7) so that the lower surface of head 104 slides over bevel 111 and thereby depresses bar 106 so that the half-nut 94 in engagement with the screw shaft 45 can travel to the left upon engagement of the clutch members without being obstructed by bar 106.

After traveling for a couple of screw turns along shaft 45 and before the loop of the condenser strips left hanging between the feed rollers and the foil cutter has been taken up by the winding mandrel, the cam 298 of the half-nut strikes cam 297 (Fig. 6), which moves feed roller 292 from its binding position to its free position by rotating the feed roller frame 244 to engage it under shoulder 264 (Fig. 5), so that the strips are pulled freely by the mandrel. (When the half-nut slides home after disengagement of the clutch members, cam 298 does not engage cam 297 as it did in traveling out because when sliding home the left side of the half-nut (Fig. 6) is raised by bar 106 so that cam 298 is above cam 297, and the slot 298a permits clearance for 297.)

The strips are then severed and the mandrel winding stopped and another indexing movement made in the manner just described.

As each mandrel bearing a rolled condenser reaches station C, the mandrel pin is withdrawn from it by the engagement of bell crank 228 with the shoulder 232 of barrel shaft 198, and the moving to the right of this bell crank (Fig. 3) due to the engagement of half-nut portion 224 with forward lead screw 226 which is driven during the revolution of shaft 68 through gears 67, 66, 273, 274, 272 and 271 (Fig. 9). During this operation the condenser is held on the half mandrel by bar 400. After shaft 221 slides all the way to the right, thus causing the barrel shaft to become latched by catch 200, pin 230 drops off the end of platform 231, causing the other half-nut portion 223 to engage with the return lead screw 225 so that shaft 221 slides back home again. The gear ratios and lead screws are so correlated that shaft 221 completes its outward and return sliding movement by the time the driving shaft 68 has completed its single revolution.

The same forward sliding movement of shaft 221 causes its other wiper arm 235 to slide each condenser off the half mandrel at station D, dropping it into a suitable chute 350 and leaving the mandrel ready for another winding when it reaches station A again.

It will be noted that the foil and paper are wound, separately cut, sealed and ejected in a continuous operation with the successive steps being automatically and progressively performed. Referring to Fig. 22 condenser a is being ejected from the mandrel at station D while a retracting arm is retracting a mandrel pin from condenser b in station C at the same time that condenser c is being rolled up and pasted at station B and condenser d which is connected to the drive is being wound at station A.

The mandrel upon which a condenser is being wound at station A is stopped after a predetermined number of turns and the foil cut. The feed rollers grip the conducting and insulating strips at a point behind the foil cutting knives during the automatic indexing movement of the mandrel support from station to station. The insulating strips of a condenser which is traveling from station A to station B during the indexing movement are spiked by the needles on the cutting arm so that the insulating strips are held in alinement. An instant later the cutting knife cuts the insulating strips, so that at the time the mandrel reaches station B the loose ends of the insulating strips are ready to be pasted and rolled up at the same time that the various other operations are being performed on other condensers at stations A, C and D.

The sequence of operations can be readily perceived by reference to the diagrams, Figs. 16 to 22, inclusive.

Fig. 16 illustrates condenser a in the course of being rolled at station A and before the foil knives 143 and 144 have severed the foils.

Fig. 17 shows the condition of the condenser strips of condenser a after the foil knives have been operated and the gaps have been formed between the severed foil ends. The mandrel in station A has now stopped rotating and the feed rollers 291 and 292 have been brought together against the strips therebetween.

In Fig. 18 the roll a just wound at station A is shown moving toward station B during the indexing movement. The paper cutting knife 168 and needles 170 have moved back out of the way of the strips being stretched across the new part mandrel moving into station A; the foil gap being the distance between e—f; and the feed rollers 291 and 292 are feeding the strips forward.

In Fig. 19 the mandrel just wound has reached station B where the pasting roll 166 is moved into contact with the condenser roll a; needles 170 have spiked the insulating strips, knife 168 has cut the insulating strips, and the half mandrel 38a has snapped into position over the strips across mandrel 38. The paper ends g and h overlap the foil ends e and f respectively.

Fig. 20 shows the roll a on mandrel 35 rolled up at the same time that the new mandrel 38 is having a condenser b rolled upon it while the feed rollers 291 and 292 have become inoperative again.

In Fig. 21 the roll a on mandrel 35 has moved down to station C, and the wound roll b on mandrel 38 has moved to station B. The retracting arm 228 has moved into position to retract the half mandrel 35a while a new condenser c on mandrel 37 is being rolled.

Fig. 22 shows the condenser roll a being ejected from the half mandrel 35 in station D by the ejecting arm 235 which has moved into the ejecting position. At the same time the retracting arm 228 is retracting the half mandrel 38a from condenser roll b in station C; and the roll c on mandrel 37 is being completed at station B; and a new condenser d is being rolled on mandrel 36 at station A.

The high degree of efficiency of the machine is readily apparent. The operation is completely automatic, and the finished rolls are delivered from the mandrels without the requirement of any manual operation.

The rate of winding the rolls is very rapid, and very little time is lost between successive windings because the stopping of the winding mandrel rotation is followed practically instantaneously by the very rapid indexing movement, after which the succeeding winding commences. Successive windings do not await the many finishing steps of rolling up the flag and pasting it and retracting the pin and ejecting the roll, because all these finishing steps are being performed in the succeeding mandrel stations B, C and D at the time rolls are being wound at station A. Even the very short time of the indexing movement is not wasted because during it the insulating strips are being spiked and severed in making ready for the succeeding winding.

The machine furthermore delivers substantially perfect condensers because all the condenser strips are automatically maintained in their proper alignment and without any human element creeping in which might tend to misalign the strips and produce defective condensers. The operation of the spiking needle 170, together with the fact that the insulating and foil supply rolls are properly aligned and offset to give the strip alignment shown in Fig. 14, automatically insures the maintenance of the alignment.

Although in the specific embodiment of the machine which has been illustrated and described there are shown specific forms of mechanical parts such as clutches, gears and driving elements, it should be understood that the invention is not limited to the use of these specific forms of parts, but extends to the use of suitable equivalent parts performing the functions disclosed.

For example, the clutch members 44 and 46 need not be of the engaging tooth construction illustrated in Figs. 1 and 7, but might be of a well known friction type in which a friction surface or cone on element 46 engages a corresponding friction surface or cone on element 44. Furthermore, if it be desired to have the clutch member 46 always stop at the same position of rotation after each clutch disengagement, member 46 might be provided with a lug which engages whenever the clutch is disengaged, with a corresponding lug fastened to the frame at the position in which it is desired the clutch member 46 shall stop. Again, the foil cutting mechanism need not necessarily be operated by the specific camming elements 124 and 120 and associated frame shown in Figs. 6 and 7, but instead, a microswitch operating a solenoid might be substituted. Such a microswitch arrangement would comprise a switch contact mounted on the half-nut 94 and a cooperating switch contact located along the path of travel of the half-nut about where cam 120 is located, and connection of these switch contacts while the half-nut is travelling could be arranged to close a circuit from an electrical source through a solenoid so that the solenoid plunger would operate on member 128 (Fig. 10) of the foil cutter like arm 127 does, to produce the cutting operation.

Another modification which might be made if desired is to cause the strip feed rollers 291 and 292 to engage upon the disengagement of the mandrel driving clutch and then to disengage when the driving clutch engages, so that these feed rollers are engaged only during the indexing movement. Such a modification is illustrated in Fig. 15. In that figure the clutch fork 47 is provided with a cam element 375 adapted to engage a corresponding cam 376 fastened to a lever 377 which is mounted on a shaft 378. Shaft 378 can be journaled in any suitable manner within a bearing 379 attached to the main frame 10. The opposite end of shaft 378 has attached to it an arm 380 which may have freely mounted at its outer end an anti-friction roller 381 adapted to rest on a bar 382. Bar 382 is attached to the frame member 244 for the lower feed roller 292. In the operation of this modification, when the clutch fork 47 is moved to the clutch disengaging position, its cam 375 moving away from cam 376 allows arm 377 to drop and rotate shaft 378 counterclockwise (with reference to Fig. 15), which lifts the roller 381 allowing bar 382 to be lifted under action of tension spring 383. This moves roller 292 into engaging position against the cooperating roller 291 so that the rollers thus feed the strips during the indexing movement of the indexing head; and when the clutch fork 47 is moved again to the clutch engaging position for the next winding, cam member 375 lifts cam 376, causing the feed roller 292 to disengage again from roller 291.

While this invention has been described in connection with a specific embodiment, it is not confined thereto and various modifications may be resorted to within the scope of the appended claims.

Instead of the latch or trigger finger 200 for holding the mandrels open, a segment of a cam may be employed, the lower end of which is formed as a hinge or latch. The cooperative part mandrel (to the right Fig. 3) has a roller attached to it and as the mandrels are opened at the bottom or third position this part mandrel catches behind the cam latch when in maximum open position. This follows around in the open position being held open by that segment of a cam for about fifty degrees. For the next thirty-nine degrees the part mandrel slowly closes until the tips of the two cooperative part mandrels are in line with each other. This modified latching means avoids any heavy shock from long quick travel of the cooperative part mandrel, taking place as the head 25 is indexed through two positions.

The pins or needles 170 (Fig. 4) may be replaced by a felt pad holding the papers after severing and provided with springs for cushioning. This pad engages across the entire web of paper pressing toward the slot in a cutting anvil. A catch may also be added to hold the frame 244 (Fig. 5) tilted and thus hold the feed rollers 291, 292 open until the driving clutch is entirely disengaged and hits its stop. This prevents these rollers from closing until the winding has stopped and avoids breakage of the paper. The clutch stop is assembled with a shoulder shaft and spring acting as a cushioner and also as a trip mechanism for the catch.

Separate motors may be used on the indexing and winding mechanisms, and the rate of winding may be varied for instance by the travel of the half-nut 94 (Fig. 7). An insulated contact on this nut making contact to a commutator. The first position of this commutator is connected on series with a rheostat, the second runs the whole length of the worm 45, and the third position is adjustable for the whole length of the worm and when adjusted, cuts out some of the second position. This third position is a metal piece insulated from the second position and slidably mounted so that the contactor will make contact with this third position through the last part of the winding. This gives an accelerated speed in the beginning of the winding, a predetermined speed in the middle and a decelerated speed at the end of the winding.

This application is a division of my copending application Serial No. 553,773, filed September 12, 1944, now Patent No. 2,384,983, issued September 18, 1945.

I claim:

1. The method of forming a condenser comprising positively gripping and feeding interleaved strips of insulating and conductive material together toward a winding station and a station at which the strips of conducted material are severed, holding said interleaved strips together at a predetermined point by surface pressure against said strips between said feed and said stations adapted to place said strips under tension by resisting the movement thereof, engaging and rotating the ends of said insulating strips at said winding station to wind the strips into roll form against said tension, releasing said positive feed so that the said strips are under the tension of said surface pressure during continuation of said winding, and applying additional tension to said strips approaching said point of surface pressure.

2. The method of forming a condenser comprising supplying interleaved strips of insulating and conductive material under positive gripping pressure, engaging and rotating the ends of said insulating strips to wind the interleaved strips into roll form, severing the strips of conducting material during said winding, by cutting the strips of conductive material while continuing the rotating of said ends and winding of the insulating strips for a predetermined length, stopping said winding and moving the wound roll to draw said insulating and conductive strips under tension from said supply, then cutting said insulating strips between said supply and said roll and rotating said cut roll, and wiping and pasting the cut ends to fasten them in place and complete the roll.

3. The method of forming a condenser as set forth in claim 2 in which the insulating and conductive strips are fed together in contact and then separated and then brought together again before winding into the roll.

4. The method of feeding and cutting strips for a condenser comprising supplying interleaved insulating and conductive strips held together in face to face contact under positive gripping pressure, separating said insulating strips from a conductive strip while winding the forward ends of said strips into roll form and feeding all of said strips forward at substantially the same rate, passing said strips back into face to face contact with each other, cutting a conductive strip at the separated area while continuing the winding and feeding of the insulating sheets and the portion of the conductive strip beyond said cut while discontinuing the feed of the conductive strip approaching said cut.

5. The method of feeding and cutting strips for a condenser comprising supplying interleaved insulating and conductive strips under tension against a predetermined drag held together in face to face contact under transverse pressure insufficient to draw an intermediate sheet against said drag, separating said insulating strips from a conductive strip while feeding all of said strips forward at substantially the same rate, passing said strips back into face to face contact with each other, cutting a conductive strip into separated parts at the separated area during the continuous feed of the insulating sheets and the portion of the conductive strip beyond said cut while discontinuing the feed of the conductive strip approaching said cut.

6. The method of feeding and cutting strips for a condenser comprising supplying interleaved insulating and conductive strips held together in face to face contact, separating said insulating strips from a conductive strip while feeding all of said strips forward at substantially the same rate, passing said strips back into face to face contact with each other while maintaining all of said strips under tension and gripping the conductive sheet between the insulating sheets at points close to the center of the separated area, cutting a conductive strip into separated parts at the separated area while discontinuing the feed of the conductive strip approaching said cut and continuing without interruption the feed of the insulating sheets and the portion of the conductive strip which is beyond said cut.

7. The method of feeding and cutting strips for a condenser as set forth in claim 6 in which there is a positive feeding of the supply of interleaved insulating and conductive strips to the point of separation of said strips after a predetermined interval following said cutting of the conductive strip.

8. The method of forming a condenser comprising supplying interleaved strips of insulating and conductive material, engaging and rotating the ends of said insulating strips to wind the interleaved strips into roll form, completing the winding of the strips into roll form, moving the wound roll bodily to a predetermined second station, and positively feeding the interleaved strips of the supply forward at a predetermined rate during said movement of the roll to control the tension on the strips.

9. The method of forming a condenser comprising supplying interleaved strips of insulating and conductive material, engaging and rotating the ends of said insulating strips to wind the interleaved strips into roll form, completing the winding of the strips into roll form, moving the wound roll bodily to a predetermined second station, and positively feeding the interleaved strips of the supply forward at a predetermined rate greater than the rate of movement of the wound roll and during said movement of the roll to control the tension on the strips.

FELIX WEISS.

REFERENCES CITED

The following references are of record in the file of this patent:

UNITED STATES PATENTS

| Number | Name | Date |
|---|---|---|
| 1,744,616 | Cummingham | Jan. 21, 1930 |
| 1,865,640 | Nyman | July 5, 1932 |
| 1,940,847 | Danziger | Dec. 26, 1933 |
| 1,952,606 | Purdy | Mar. 27, 1934 |
| 2,205,171 | Kile et al. | June 18, 1940 |
| 2,241,141 | Knab | May 6, 1941 |
| 2,333,570 | Hild | Nov. 2, 1943 |
| 2,416,540 | Nordberg | Feb. 25, 1947 |